Patented Mar. 26, 1946

2,397,260

UNITED STATES PATENT OFFICE 2,397,260

POLYMERIZATION OF ETHYLENE WITH OTHER POLYMERIZABLE SUBSTANCES

William E. Hanford, Wilmington, and John R. Roland, McDaniel Heights, Del., assignors to E. I. du Pont de Nemours & Company, Wilmington, Del., a corporation of Delaware No Drawing. Application November 1, 1941, Serial No. 417,476

6 Claims. (Cl. 260—92.5)

This invention relates to new polymeric products, more specifically to polymers of vinylidene chloride and particularly to polymers of vinylidene chloride and ethylene as well as processes for their preparation.

Vinylidene chloride has been polymerized by a variety of methods known to the art. Polymeric vinylidene chloride itself is practically insoluble, infusible, and exhibits exceptionally poor stability to heat. These properties make it difficult to work or handle the polymer and have therefore highly restricted its use. Methods of the prior art have improved upon these properties in varying degrees by interpolymerizing vinylidene chloride with other polymerizable compounds. However, many of these compositions still exhibit the poor heat stability, brittleness and infusibility of the original polymer. Moreover, many of them are expensive because of the high cost of the other polymerizable compounds.

It is an object of this invention to overcome the disadvantages of the prior art and to provide polymers of vinylidene chloride of improved characteristics.

It is an additional object of the present invention to provide methods for producing new and improved polymers of vinylidene chloride.

It is a more specific object of the present invention to provide polymers of vinylidene chloride and ethylene and methods for producing such polymers.

Other objects and advantages will be apparent from the following description of the invention.

According to the present invention, polymers of vinylidene chloride and ethylene are prepared by heating these two compounds alone, or together with another polymerizable organic compound, in the presence of a polymerization catalyst, under elevated temperature conditions. The following general procedure illustrates one manner of practicing the process of this invention which may be operated batchwise, semicontinuously, or continuously.

A pressure-resistant reaction vessel is charged with a polymerization catalyst and vinylidene chloride. If desired, water or an organic liquid solvent, or both, may be included in the charge. The vessel is then closed, placed in a heated shaker machine and connected to a source of ethylene. Controlling and recording thermocouples are inserted, ethylene is added to the reaction vessel and heating and agitation are started. Upon reaching the reaction temperature, or after a period of induction, the reaction starts and is normally followed by a pressure decrease due to the utilization of the ethylene. The pressure in the system is maintained throughout the reaction period either by the addition of fresh ethylene or vinylidene chloride, or a mixture of the two, or by decreasing the free space in the reaction vessel by increasing the volume of the menstruum.

When the reaction is complete, as evidenced by cessation of absorption of ethylene, the vessel is cooled, bled of excess ethylene, opened, and the reaction mixture discharged. The polymer is isolated from the reaction mixture by means known to the art. A further modification of the invention, as indicated in the previous general statement of the invention, includes the polymerization of a third polymerizable organic compound with the vinylidene chloride and ethylene. This material may be added with the catalyst and vinylidene chloride or, if it is a gas at normal temperatures and pressures, it may be expanded from pressure storage tanks into the closed reaction vessel prior to pressuring with ethylene.

The operating conditions employed in carrying out this invention may vary over a wide range. Thus, the temperatures used may be in the range of from 40° C. to 350° C., generally from 50° C. to 250° C. and preferably from 50° C. to 150° C. Since in general the molecular weight of the product is an inverse function of the reaction temperature the latter is kept as low as is consistent with practical reaction rates.

The reaction is carried out under superatmospheric pressures and generally at pressures in the range of from 50 to 1500 atmospheres, and preferably in the range of 200 to 1000 atmospheres. The upper limit of pressure which can be used, however, is that dictated by the strength of the equipment. The temperature and pressure are interdependent variables and either must therefore be adjusted with regard to the other.

In the polymerization of vinylidene chloride with ethylene according to this invention it is desirable to use relatively small amounts of catalytic materials. These catalysts may be defined as "per-oxy compounds" which are defined in Webster's International Dictionary as being compounds having the bivalent radical —O—O—. Examples of such compounds, in addition to those specifically disclosed in the examples, are persuccinic acid, higher diacyl peroxides, i. e., lauroyl peroxide, tetralin peroxide, urea peroxide, butyryl peroxide, acetyl peroxide, acetyl benzoyl peroxide, peracetic acid, alkali metal persulfates, perborates, percarbonates, and the like; and ammonium persulfate, perborate, percarbonate, and the like. There may also be employed combinations of the above catalysts as well as combinations of persulfates such as sodium or potassium persulfates with selected buffering agents such as alkali metal phosphates which may be produced by adding sodium hydroxide to phosphoric acid until a pH of about 9 is obtained. Tetraethyllead and other organometallic compounds which give rise to free radicals on thermal decomposition are also operative as catalysts in the process, as is also molecular oxygen at temperatures above 125° C. The amount of catalyst used may vary over a wide range but generally speaking it is of the order of 0.1% or more, based on the weight of the total polymerizable monomers. As much as 5-10% of catalyst based on the total polymerizable monomers may be employed, but it is generally desirable to use less than this since with large amounts of catalysts the molecular weight of the product is usually low.

The polymerization of vinylidene chloride with ethylene may be suitably carried out without solvent or diluent. In certain instances, however, it may be preferable to carry out the polymerization in an aqueous medium. By aqueous medium is meant a medium consisting solely of water or water with a non-polymerizable organic compound and preferably a volatile organic liquid compound such as isooctane, toluene, benzene, butyl acetate, diethyl ether, normal hexane, cyclohexane, cyclohexanone, butanol, methanol, dioxane, metabromotoluene, petroleum ether, gasoline and the like. In operating in an aqueous medium it is not necessary to use surface active agents but the addition of such compounds may sometimes be desirable. Suitable examples are starch, the water soluble salts of the higher alkyl sulfates and alkanesulfonates, alkali metal salts of sulfonated mineral oils, and such non-ionic water soluble compounds as are obtained by the condensation of several moles of ethylene oxide with long-chain amines, alcohols or acids.

The following examples serve to illustrate the process of the invention and to demonstrate suitable conditions of operation. The quantities of reactants are given in parts by weight unless otherwise stated.

*Example 1*

A silver-lined steel reaction vessel is charged with 140 parts of water, 60 parts of vinylidene chloride, 5 parts of a 50% solution of the sodium salt of sulfated 9,10-octadecenyl acetate, and 0.2 part of benzoyl peroxide. The pH is adjusted from 6.5 to 3.4 with dilute hydrochloric acid. The vessel is closed, placed in an agitating machine, pressured with ethylene, and heating and agitation started. During a reaction time of 11 hours throughout which the temperature is maintained at 75 to 76° C. and the pressure at 850–950 atmospheres, the total observed pressure drop is 215 atmospheres. The tube is cooled, bled of excess ethylene, opened, and the contents discharged. There is thus obtained 20 parts of a polymer which contains 58.8% chlorine. From this analysis it can be calculated that the polymer has an ethylene-vinylidene chloride mole ratio of 1:1.2.

*Example 2*

The preceding experiment is repeated but with substitution of 0.5 part of a 30% solution of hydrogen peroxide for the benzoyl peroxide used as catalyst. The pH is adjusted from 6.4 to 2.9 with dilute hydrochloric acid. During a reaction time of 8.75 hours throughout which the temperature is maintained at 69° to 72° C. and the pressure at 920 to 950 atmospheres, the total observed pressure drop is 100 atmospheres. The reaction mixture is worked up as in the preceding experiment and yields 14 parts of a polymer which contains 52.8% chlorine. From this analysis it may be calculated that the product has an ethylene-vinylidene chloride mole ratio of 1.4:1.

*Example 3*

A silver-lined steel reaction vessel is charged with 180 parts of water, 20 parts of vinylidene chloride, 5 parts of the sodium salt of sulfated 9,10-octadecenyl acetate, and 0.2 part of benzoyl peroxide. The pH of this mixture is adjusted from 6.8 to 2.8 by the addition of a few drops of dilute hydrochloric acid. During a reaction time of 11 hours, throughout which the temperature is maintained at 95° to 100° C. and the pressure at 860 to 960 atmospheres, the total pressure drop is observed to be 270 atmospheres. The polymer is isolated as in the preceding experiments and amounts to 33 parts of a substance which contains 36.8% chlorine. From this analysis it may be calculated that the ethylene-vinylidene chloride mole ratio of the copolymer is 3.4:1.

*Example 4*

A silver-lined steel reaction vessel is charged with 200 parts of vinylidene chloride and 0.6 part of benzoyl peroxide. The vessel is closed and pressured with ethylene so that at 68° to 73° C. the pressure is 860 to 960 atmospheres. During a reaction period of 17 hours, there is a total observed pressure drop of 565 atmospheres. The reaction mixture is worked up as in preceding experiments and yields 133 parts of vinylidene chloride-ethylene polymer. The polymer is an opaque white plastic which is completely soluble in toluene and hydrocarbon solvents. Films of the copolymer do not darken on heating at 70° C. for 10 hours.

*Example 5*

An aluminum-lined steel reaction vessel is charged with 60 parts of water, 40 parts of vinylidene chloride, 0.1 part of benzoyl peroxide and 0.1 part of potassium persulfate. The pH is 3.8. The tube is closed, evacuated, and pressured with ethylene. Heating and agitation are started and during a reaction time of 10.6 hours, throughout which the temperature is maintained at 78 to 81° C., and the pressure at 850 to 945 atmospheres, the total observed pressure drop is 375 atmospheres. The reaction mixture has a pH of 3.6. When worked up as in the preceding examples this reaction mixture yields 39 parts of a polymer of vinylidene chloride with ethylene which contains 35.2% chlorine. From this analysis it may be calculated that the copolymer has a vinylidene chloride-ethylene mole ratio of 1:3.7.

*Example 6*

An aluminum-lined steel reaction vessel is charged with 80 parts of water, 10 parts of vinylidene chloride, 10 parts of vinyl acetate, and 0.2 part of benzoyl peroxide. The pH is 3.6. After pressuring with ethylene, the tube is heated and agitated as in the foregoing experiments. During a reaction time of 10.3 hours, throughout which the temperature is maintained at 79 to 81° C. and the pressure at 850 to 950 atmospheres, the total observed pressure drop is 625 atmospheres. The pH of the reaction mixture is 3.5. The reaction mixture when worked up as in the foregoing examples yields 49 parts of a copolymer which contains 6.40% chlorine, 77.1% carbon, and 12.8% hydrogen. From these analyses it may be calculated that the product has a mole ratio of ethylene:vinylidene chloride:vinyl acetate= 32:1:1.3.

The preceding example is repeated with a charge consisting of 80 parts of water, 7 parts of vinylidene chloride, 14 parts of vinyl acetate, and 0.2 part of benzoyl peroxide. The pH is adjusted from 4.1 to 3.2 with dilute formic acid. The product amounts to 49 parts and contains 7.6% chlorine, 77.9% carbon, and 12.4% hydrogen. From these analyses it may be calculated that the polymer has a mole ratio of ethylene:vinylidene chloride:vinyl acetate=47:1.7:1.

Example 6 is repeated with a charge consisting of 80 parts of water, 14 parts of vinylidene chloride, and 7 parts of vinyl acetate, and 0.2 part of benzoyl peroxide. The pH is adjusted from 4.3 to 3.2 with dilute formic acid. The product amounts to 46 parts of a copolymer containing 12.4% chlorine, 75% carbon, and 11.7% hydrogen. From these analyses it may be calculated that the polymer has a mole ratio of ethylene:vinylidene chloride:vinyl acetate=47:2.9:1.

The ethylene employed in the operation of this invention may contain small quantities of methane, ethane, nitrogen, hydrogen, propane, or oxygen. The tolerable amount of impurity depends upon its nature, the first five enumerated having negligible effect on the rate and extent of reaction. Since the effect of large amounts of oxygen is generally deleterious, its concentration in the ethylene should be maintained as low as practical.

In place of the vinyl acetate of Example 6 there can be used, if desired, other polymerizable organic compounds such as vinyl esters, ethers and ketones as vinyl chloride, vinyl propionate, vinyl benzoate, vinyl chloracetate, vinyl methyl ether, vinyl ethyl ether, vinyl butyl ether, vinyl phenyl ether, vinyl methyl ketone, vinyl ethyl ketone, and the like; chloro alkenes as vinylidene bromide, 2-chloropropene-1, trichloro-ethylene, 2-chloro-1,3-butadiene; esters, amides and nitriles of acrylic and methacrylic acid as methyl, ethyl, propyl or butyl acrylates and methacrylates, acrylamide, methacrylamide, N-alkyl and N,N-dialkyl acrylamides and methacrylamides, acrylonitrile and methacrylonitrile; esters, amides, and nitriles of fumaric, maleic, itaconic, and citraconic acids as dimethyl, diethyl fumarates, maleates, itaconates, citraconates and the like; fumaramide, maleamide, itaconamide, citraconamide, fumaronitrile, maleonitrile, itacononitrile, and citracononitrile; unsaturated hydrocarbons as propylene, isobutylene, camphene, methylenecyclohexane, octene-1, butadiene, isoprene and the like.

In the practice of this invention it is desirable to use equipment fabricated of or lined with materials which will not catalyze too rapidly the decomposition of peroxides to molecular oxygen. Examples of such materials suitable for this use are: silver, aluminum; tin; lead; glass; and the stainless steels.

For rapid polymerization it is desirable to provide intimate contact between all the reactants by agitation. By the term "agitation" as used herein it is intended to include any means for accomplishing intimate contact between the reactants, for example, rapid stirring, turbulence in a continuous process, atomization, shaking, or efficient bubbling of the gas or gases through the liquid phase.

In carrying out the present invention in an aqueous medium, the pH of the reaction medium affects the rate and extent of polymerization. The most suitable pH range is dependent on the catalyst employed and on the polymerizable components. Benzoyl peroxide, for example, is most effective at a pH in the range from about 1.0 to 4.1 while persulfates are most effective at a pH above about 7.0 and preferably in the range from 9.0 to 12.0. In the present invention the pH may be adjusted or maintained by use of buffer salts such as potassium dihydrogen phosphate, sodium acetate, sodium carbonate, sodium tetraborate and the like and/or by the addition of acid or alkali such as hydrochloric, hydrobromic, sulfuric and formic acid and sodium and potassium hydroxides.

The ratio of vinylidene chloride to ethylene in the polymer may be varied widely. Control of this variable is easily effected by varying the amount of vinylidene chloride charged, varying the ratio of vinylidene chloride to solvent or water, by variation of the ethylene pressure, by variation of the ratio of "free space" in the reactor to the liquid charge and, to a lesser degree, by variation of the reaction temperature.

Various changes may be made in the details and preferred embodiments of this invention without departing therefrom or sacrificing the advantages thereof.

We claim:

1. A process for producing polymers of ethylene and vinylidene chloride which comprises heating ethylene and vinylidene chloride in the presence of a per-oxy compound catalyst, at a temperature of from 40 to 350° C., and at a pressure of from 50 to 1500 atmospheres.

2. A process for producing polymers of ethylene and vinylidene chloride which comprises heating ethylene and vinylidene chloride in the presence of benzoyl peroxide, at a temperature of 50° to 150° C., and at a pressure of 200 to 1000 atmospheres.

3. A process for producing polymers of ethylene and vinylidene chloride which comprises heating ethylene and vinylidene chloride in an aqueous medium, in the presence of benzoyl peroxide, at a temperature of 50° to 150° C., and at a pressure of from 200 to 1000 atmospheres.

4. A polymer of vinylidene chloride and ethylene obtained by heating ethylene and vinylidene chloride in the presence of a peroxy compound catalyst, at a temperature of from 40 to 350° C., and at a pressure of from 50 to 1500 atmospheres.

5. A process for producing polymers of ethylene and vinylidene chloride which comprises heating ethylene and vinylidene chloride in the presence of benzoyl peroxide, at a temperature of 40 to 350° C., and at a pressure of from 850 to 950 atmospheres.

6. A process for producing polymers of ethylene and vinylidene chloride which comprises heating ethylene and vinylidene chloride in an aqueous medium, in the presence of a peroxy compound catalyst, at a temperature of 40 to 350° C., and at a pressure of from 50 to 1500 atmospheres.

WILLIAM E. HANFORD.
JOHN R. ROLAND.